(12) United States Patent
Sasage et al.

(10) Patent No.: US 6,814,799 B2
(45) Date of Patent: Nov. 9, 2004

(54) HYDRAULIC COMPOSITION FOR EXTRUSION MOLDING

(75) Inventors: Yoshiaki Sasage, Niigata-ken (JP); Tsutomu Yamakawa, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 55 days.

(21) Appl. No.: 10/166,619

(22) Filed: Jun. 12, 2002

(65) Prior Publication Data

US 2003/0000426 A1 Jan. 2, 2003

(30) Foreign Application Priority Data

Jun. 13, 2001 (JP) ........................................ 2001-178699

(51) Int. Cl.⁷ .................................................. D06P 1/44
(52) U.S. Cl. ...................... 106/730; 106/715; 106/724; 106/728
(58) Field of Search ................................ 106/724, 715, 106/728, 730

(56) References Cited

U.S. PATENT DOCUMENTS

| | | | | |
|---|---|---|---|---|
| 4,130,440 A | * | 12/1978 | Nose et al. ................. | 106/627 |
| 4,654,085 A | * | 3/1987 | Schinski ....................... | 524/5 |
| 5,154,771 A | | 10/1992 | Wada et al. | |
| 5,192,366 A | * | 3/1993 | Nishioka et al. | |
| 5,256,349 A | * | 10/1993 | Sato et al. ................... | 106/711 |
| 5,308,397 A | * | 5/1994 | Whatcott | |
| 5,352,290 A | * | 10/1994 | Takeshita et al. ........... | 106/802 |
| 5,385,607 A | * | 1/1995 | Kiesewetter et al. ..... | 106/172.1 |
| 5,466,289 A | * | 11/1995 | Yanezawa et al. | |
| 5,637,144 A | * | 6/1997 | Whatcott et al. | |
| 5,669,968 A | * | 9/1997 | Kobori et al. | |
| 5,733,367 A | * | 3/1998 | Soeda et al. | |
| 5,919,300 A | * | 7/1999 | Burge et al. | |
| 6,454,849 B1 | * | 9/2002 | Kinoshita et al. | |
| 6,475,275 B1 | * | 11/2002 | Nebesnak et al. | |

FOREIGN PATENT DOCUMENTS

| | | |
|---|---|---|
| EP | 0 409 609 A | 1/1991 |
| JP | 9194246 A | 7/1997 |

OTHER PUBLICATIONS

Patent Abstract of Japan; vol. 1996, No. 09; Sep. 30, 1996.
Patent Abstract of Japan; vol. 1996; No. 08; Aug. 30, 1996.

* cited by examiner

*Primary Examiner*—Archene Turner
(74) *Attorney, Agent, or Firm*—Millen, White, Zelano, Branigan, P.C.

(57) ABSTRACT

To a hydraulic composition for extrusion molding comprising a hydraulic substance, organic reinforcing fibers, and a thickening process aid, a defoamer containing a polyether component is added for preventing the composition from spring-back and imparting improved strength properties thereto.

13 Claims, No Drawings

HYDRAULIC COMPOSITION FOR EXTRUSION MOLDING

This invention relates to hydraulic compositions, typically cement compositions, suited for extrusion molding to form hardened products having improved dimensional stability and minimized spring-back.

BACKGROUND OF THE INVENTION

In traditional hydraulic compositions for extrusion molding, asbestos were used as reinforcing fibers. In the recent years, the amount of asbestos used drastically decreased due to health considerations and legal regulations. At present, pulp fibers are often used as the substitute. However, when formulated into hydraulic compositions, pulp fibers are likely to form clumps, difficult to disperse, and less wettable with water. Then extrusion molded products of these hydraulic compositions exhibit substantial spring-back, leading to the drawbacks of crazing likelihood and dimensional instability. This tendency becomes more outstanding as the length of pulp fibers increases. In particular, pulp fibers having an average length in excess of 700 μm result in extrusion molded plates with considerable spring-back, imposing a necessity to plane the surface of extrusion molded plates after hardening. Nevertheless, the current tendency is more frequent use of such long pulp fibers because longer fibers are more effective for reinforcement.

A variety of proposals have been made to solve these phenomena. For example, JP-A 9-194246 discloses a method of preventing spring-back by adjusting the water content of pulp fibers for rendering them more dispersible. The water content of pulp fibers is adjusted by such operation as drying, dehydrating or humidifying. The management of the water content of pulp fibers, however, adds a cumbersome step of determining the net amount of water to be added by subtracting the water content in pulp from the necessary amount of water.

SUMMARY OF THE INVENTION

An object of the present invention is to provide a hydraulic composition suited for extrusion molding to form hardened products having improved dimensional stability and minimized spring-back. Another object is to provide such a hardened product.

Making a study to reduce the spring-back of an extrusion molded product of a hydraulic composition comprising organic reinforcing fibers such as pulp fibers, but free of asbestos, we have found that the addition of a thickening process aid and a polyether component-bearing defoamer to the hydraulic composition restrains the composition from spring-back and improves the dimensional stability thereof even when organic reinforcing fibers having an increased length are used.

Accordingly, the present invention provides a hydraulic composition for extrusion molding comprising a hydraulic substance, organic reinforcing fibers, a thickening process aid, and a defoamer containing a polyether component. A product obtained by hardening the hydraulic composition is also contemplated.

DESCRIPTION OF THE PREFERRED EMBODIMENT

In the hydraulic composition for extrusion molding according to the invention, a typical hydraulic substance is cement. Cements that may be used in the hydraulic compositions include ordinary Portland cement, high-early-strength portland cement, blast furnace slag cement, fly-ash cement and alumina cement. Gypsum-based hydraulic substances may also be used including the dihydrate, hemihydrate and anhydrous forms of gypsum. The amount of cement or gypsum-based hydraulic substances may be determined as needed to achieve the required strength.

Pulp fibers are preferably used as the organic reinforcing fibers. The pulp fibers are, most often those of hardwood pulp, although fibers of softwood pulp, linter pulp, recycled paper or the like may also be used. Although relatively short pulp fibers which are often used in the prior art can also be used, more advantages of the present invention are exploited when pulp fibers having an average fiber length of at least 700 μm which would otherwise cause substantial spring-back are used. Besides, polypropylene fibers, vinylon fibers, acrylic fibers and other polymeric fibers may be added alone or in admixture of any or in combination with the pulp fibers.

An appropriate amount of the organic reinforcing fibers used is 0.1 to 50 parts, and especially 0.15 to 40 parts by weight per 100 parts by weight of the hydraulic substance.

A thickening process aid is added to the hydraulic composition because compositions comprising cement, aggregates and reinforcing fibers have so poor plasticity and water retention abilities that the composition remain unmoldable unless the thickening process aid is added. Typical of the thickening process aid which is used for this purpose are water-soluble cellulose ethers. Illustrative water-soluble cellulose ethers are hydroxyalkyl alkyl celluloses, such as hydroxypropyl methyl cellulose, hydroxyethyl methyl cellulose, and hydroxyethyl ethyl cellulose. Also useful are alkyl celluloses and hydroxyalkyl celluloses such as methyl cellulose and hydroxyethyl cellulose. All these are water soluble. In certain applications, it is acceptable to use thickeners, for example, semi-synthetic water-soluble polymers such as modified starch, synthetic water-soluble polymers such as polyvinyl alcohol, polyacrylamide, polyethylene glycol and polyethylene oxide, and fermentation polysaccharides such as wellan gum, optionally in combination with cellulose ether thickeners.

The thickening process aid should preferably have a viscosity of about 100 to 50,000 mPa·s as a 1 wt % aqueous solution thereof at 20° C. A thickening process aid having a viscosity of at least 5,000 mPa·s is often used because it is economical.

An appropriate amount of the thickening process aid added is 0.3 to 2.0% and especially 0.5 to 1.5% by weight of the entire composition excluding water. The inclusion of too little aid may fail to provide the necessary water retention and plasticity, making extrusion molding difficult to carry out. Conversely, too much aid raises the viscosity of the composition which becomes difficult to extrusion mold and sticks more to the die, resulting in a molded part with burrs.

Most often, an aggregate is also included in the hydraulic composition. Typical aggregates are powdered silica and fly ash. For weight reduction purposes, perlite, organic and inorganic microballoons, and styrene beads are sometimes used. In any case, a suitable aggregate is combined with the hydraulic substance so that the resulting composition may have desired properties. The hydraulic substance and the aggregate may be used in a weight ratio of from 10:90 to 100:0.

In some cases, setting accelerators, setting retarders, and surfactants such as water reducing agents and dispersants are also included. Since these agents serve to manage the physical properties of fresh compositions immediately after water addition and mixing, it is acceptable to select any desired one of them for a particular purpose and add it in an ordinary amount.

In the hydraulic composition of the invention, a defoamer containing a polyether component is included. The defoamer may be in either liquid or powder form. Such defoamers are commercially available under the trade name of Disfoam series from NOF Corp., Leocon series from Lion Corp., Emasol series from Kao Corp., Defoamer series and Dappo series from San Nopco Ltd., Agitan series from MUNZING CHEMIE GmbH, Pluronic series, Tetronic series, Adekanol series and Adekanate series from Asahi Denka Kogyo K.K. Other agents containing a polyether component having an antifoaming ability are also commercially available. An appropriate amount of the defoamer added is 0.001 to 2%, and especially 0.005 to 1.0% by weight based on the entire composition excluding water. Outside the range, less amounts of the defoamer may achieve no desired effects and fail to prevent spring-back whereas excessive amounts of the defoamer may result in a dry and stiff mixture which is difficult to extrusion mold.

Water is added to the hydraulic composition. The amount of water added is determined depending on the type of the hydraulic composition and may be an ordinary amount. Typically water is added in an amount of about 15 to 150 parts by weight per 100 parts by weight of the hydraulic substance and aggregate combined.

EXAMPLE

Examples of the invention are given below by way of illustration and not by way of limitation.

Examples & Comparative Examples

Using the following ingredients, cement base compositions for extrusion molding were prepared according to the formulation shown in Tables 1 to 3.

(1) Cement: ordinary Portland cement
(2) Powdered silica: silica powder sieved fraction
(3) Perlite: mean particle size 0.5 mm
(4) Pulp: virgin pulp, average fiber length 2200 $\mu$m
(5) Water-soluble cellulose ether:
  METOLOSE SHV-P (hydroxypropyl methyl cellulose) viscosity 13,800 mPa·s at 20° C., 1 wt % aqueous solution (Brookfield viscometer, 12 rpm)
(6) Polyether type defoamer:
  Pluronic L-61 (liquid, Asahi Denki Kogyo K.K.)
  Disfoam CA-220 (liquid, NOF Corp.)
  SN Defoamer 14-HP (powder, San Nopco Ltd.)
  AGITAN P803 (powder, MUNZING CHEMIE GmbH)

All the ingredients excluding water were mixed in a Henschel mixer for 3 minutes. A predetermined amount of water was added to the mixture, followed by mixing for a further 2 minutes. It is noted that of the defoamers, the liquid ones were added to water. Thereafter, the mixture was mixed in a 10-liter kneader/extruder for 5 minutes and extrusion molded in vacuum. The die was sized 20 mm×40 mm. The extrudate was cut to a length of 16 cm, obtaining ten specimens for the measurement of percent spring-back and flexural strength. The specimens were cured in an autoclave and dried before the measurements. The results are shown in Tables 1 to 3.

For the curing, the specimens were sealed in a vinyl bag and cured at 65° C. for 15 hours and then in an autoclave at 170° C. for 8 hours. Thereafter, they were dried in a blowing drier held at 130° C. for 2 hours so as to bring a water content to below 10%.

The percent spring-back was calculated as [(thickness of hardened specimen)−(die thickness)]/(die thickness)×100% wherein the die thickness was 20 mm.

The flexural strength was measured by placing the specimen on 75 mm spaced supports such that the 20 mm side was a thickness direction, and applying a load to the specimen at the center.

TABLE 1

| Ingredients (pbw) | Example 1 | Example 2 | Example 3 | Example 4 |
|---|---|---|---|---|
| Cement | 35 | 35 | 35 | 35 |
| Silica powder | 35 | 35 | 35 | 35 |
| Perlite | 18.5 | 18.5 | 18.5 | 18.5 |
| Pulp | 10 | 10 | 10 | 10 |
| METOLOSE SHV-P | 1.5 | 1.5 | 1.5 | 1.5 |
| Pluronic L-61 | 0.001 | 0.05 | 1.0 | 2.0 |
| Disfoam CA-220 | — | — | — | — |
| SN Defoamer 14-HP | — | — | — | — |
| AGITAN P803 | — | — | — | — |
| Water | 53 | 53 | 53 | 53 |
| Results | | | | |
| Spring-back, % | 4.7 | 3.8 | 3.5 | 3.3 |
| Flexural strength, N/mm$^2$ | 12.8 | 15.1 | 16.1 | 15.9 |

TABLE 2

| Ingredients (pbw) | Example 5 | Example 6 | Example 7 | Example 8 |
|---|---|---|---|---|
| Cement | 35 | 35 | 35 | 35 |
| Silica powder | 35 | 35 | 35 | 35 |
| Perlite | 18.5 | 18.5 | 18.5 | 18.5 |
| Pulp | 10 | 10 | 10 | 10 |
| METOLOSE SHV-P | 1.5 | 1.5 | 1.5 | 1.5 |
| Pluronic L-61 | — | — | — | — |
| Disfoam CA-220 | 0.5 | 1.0 | — | — |
| SN Defoamer 14-HP | — | — | 0.2 | 1.5 |
| AGITAN P803 | — | — | — | — |
| Water | 53 | 53 | 53 | 53 |
| Results | | | | |
| Spring-back, % | 4.2 | 3.8 | 4.0 | 3.5 |
| Flexural strength, N/mm$^2$ | 14.3 | 15.1 | 14.8 | 15.5 |

TABLE 3

| Ingredients (pbw) | Example 9 | Example 10 | Comparative Example 1 |
|---|---|---|---|
| Cement | 35 | 35 | 35 |
| Silica powder | 35 | 35 | 35 |
| Perlite | 18.5 | 18.5 | 18.5 |
| Pulp | 10 | 10 | 10 |
| METOLOSE SHV-P | 1.5 | 1.5 | 1.5 |
| Pluronic L-61 | — | — | — |
| Disfoam CA-220 | — | — | — |
| SN Defoamer 14-HP | — | — | — |
| AGITAN P803 | 0.05 | 0.2 | — |
| Water | 53 | 53 | 53 |
| Results | | | |
| Spring-back, % | 4.1 | 3.3 | 6.9 |
| Flexural strength, N/mm$^2$ | 13.9 | 14.7 | 10.5 |

There has been described a hydraulic composition for extrusion molding to which a defoamer containing a polyether component is added for preventing the molded composition from undergoing spring-back and imparting improved strength properties to the composition.

Japanese Patent Application No. 2001-178699 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A hydraulic composition for extrusion molding comprising:
   a hydraulic substance,
   organic reinforcing fibers,
   a thickening process aid which comprises a water-soluble cellulose ether having a viscosity of about 100 to 50,000 mPa·s when in a 1 weight % aqueous solution at 20° C., and
   a defoamer containing a polyether component.

2. The hydraulic composition of claim 1 wherein the defoamer containing a polyether component is provided in an amount of 0.001 to 2% by weight of the entire composition excluding water.

3. A product obtained by hardening the hydraulic composition of claim 1, wherein the organic reinforcing fibers are pulp fibers.

4. The hydraulic composition of claim 1, wherein the hydraulic substance is a cement or gypsum substance.

5. The hydraulic composition of claim 3, wherein the pulp fibers have an average fiber length of at least 700 μm.

6. The hydraulic composition of claim 1, wherein the organic reinforcing fibers are provided in an amount of 0.1 to 50 parts by weight per 100 parts by weight of the hydraulic substance.

7. The hydraulic composition of claim 1, wherein the water-soluble cellulose ether of the thickening process aid is selected from the group consisting of hydroxyalkyl alkyl celluloses, alkyl celluloses and hydroxyalkyl celluloses.

8. The hydraulic composition of claim 1, wherein the thickening process aid has a viscosity of 5,000 to 50,000 mPa·s when in a 1 weight % aqueous solution at 20°C.

9. The hydraulic composition of claim 1, wherein the thickening process aid is provided in an amount of 0.3 to 2.0% by weight of the entire composition excluding water.

10. The hydraulic composition of claim 1, wherein the thickening process aid is provided in an amount of 0.5 to 1.5% by weight of the entire composition excluding water.

11. The hydraulic composition of claim 1, wherein the composition further comprises an aggregate.

12. The hydraulic composition of claim 1 wherein the defoamer containing a polyether component is provided in an amount of 0.005 to 1.0% by weight of the entire composition excluding water.

13. The hydraulic composition of claim 1 wherein the composition is free of asbestos fibers.

* * * * *